United States Patent [19]

Seymour et al.

[11] 4,161,575

[45] Jul. 17, 1979

[54] CATALYST FOR EPOXY POWDER COATINGS

[75] Inventors: John P. Seymour, Marcus Hook; Rocco L. Mascioli, Media; Burton D. Beitchman, Springfield; Philip J. Zaluska, Schnecksville, all of Pa.

[73] Assignee: Air Products and Chemicals, Inc., Allentown, Pa.

[21] Appl. No.: 950,907

[22] Filed: Oct. 12, 1978

[51] Int. Cl.$^2$ ............................................. C08G 59/68
[52] U.S. Cl. ...................................... 528/90; 528/94; 528/408
[58] Field of Search ........................... 528/90, 94, 408

[56] References Cited

U.S. PATENT DOCUMENTS

| | | | |
|---|---|---|---|
| 3,642,649 | 2/1972 | Green et al. | 252/182 |
| 3,660,354 | 5/1972 | Uelzmann | 260/47 EC |
| 3,862,150 | 1/1975 | Bechara et al. | 260/268 T |

*Primary Examiner*—Earl A. Nielsen
*Attorney, Agent, or Firm*—Russell L. Brewer; E. Eugene Innis; Barry Moyerman

[57] ABSTRACT

This invention relates to a catalyst system comprising a triethylene diamine salt of thiocyanic acid for epoxy powder coatings, the epoxy compound having a lower softening point of not less than 40° C. The catalysts for these coatings have latent activity in that they remain substantially inactive during mixing and extruding, but are highly effective at the cure temperatures.

3 Claims, No Drawings

CATALYST FOR EPOXY POWDER COATINGS

BACKGROUND OF THE INVENTION

1. Field of the Invention

This invention relates to a catalyst system for epoxy powder coatings, the catalysts having delayed action.

2. Description of the Prior Art

U.S. Pat. No 3,642,649 describes a low temperature epoxy curing accelerator consisting of a tertiary amine salt of hydrobromic acid, paratoluene sulfonic acid, 2-ethyl hexoic acid and thiocyanic acid. Representative amines include triethylene diamine, methyl triethylenediamine and 2-ethyl-4-methyl imidazole.

U.S. Pat. No. 3,862,150 relates to tertiary amine salts of alpha-substituted carboxylic acids, e.g. a dimethylethanol amine salt of cyanoacetic acid or a triethylenediamine salt of cyanoacetic acid as a catalyst system for cellular urethane forming compositions. The significant advantage of the salts is that they have delayed action and greatly extend the pot life of the urethane molding composition.

SUMMARY OF THE INVENTION

This invention relates to a process for curing epoxy powder coating compositions utilizing a triethylenediame salt of thiocyanic acid as the catalyst. In the process, the epoxy compound is premixed with a leveling agent, pigment and catalyst under molten conditions not exceeding a temperature of 300° F. for less than 2 minutes, the molten composition then being extruded, solidified, and the solidified material grounded to form a precatalyzed epoxy powder coating composition. The improvement resides in using a triethylene diamine salt of thiocyanic acid generally in a proportion of from about 2-10 parts by weight per 100 parts of epoxy compound as the sole catalyst system.

Advantages of this process include:

the formation of an epoxy powder coating composition which has excellent shelf life, but yet has an excellent rate at curing temperatures;

the formation of a product which upon cure, has little to substantially no discoloration;

the formation of a molded product which has excellent physical properties in terms of reduced wrinkle or orange peel effect, and high impact strength.

DESCRIPTION OF THE PREFERRED EMBODIMENTS

In the practice of this invention, the epoxy resins are those which are solid at room temperature, and preferably those which have a lower melting point of not less than 40° C., and preferably those which have a lower melting point of not less than 40° C., and preferably not less than 60° C. These epoxy resins are 1,2-epoxy compounds with an epoxy equivalent weight of from about 500-1,000. Typically, these epoxy resins are of the Bisphenol A type, and are formed by reacting dihydroxy compounds with epichlorohydrin in the presence of alkali. Specific examples of dihydroxy compounds which can be used for reaction with epichlorohydrin are: 2,2-bis-(4-hydroxyphenyl)-propane; 4,4'-dihydroxy benzophenone, 1,1-bis(4-hydroxyphenyl)-ethane; bis(2-hydroxynaphthyl) methane; and 1,5-dihydroxynaphthalene.

The sole catalyst used in the process is a triethylene diamine salt of thiocyanic acid which includes both the mono and bis amine salts. These salts can be prepared in conventional manner, e.g. by the reaction of the appropriate stoichiometric quantities of triethylene diamine and thiocyanic acid or a precursor thereof, e.g. ammonium thiocyanate. Where the precursor is used, water generally is added to the reaction mixture and the contents heated to reflux temperature to drive off ammonia. This technique is known in the art.

Similar compositions have been utilized as noted in the prior art to catalyze the cure of epoxy powder coatings. These include triethylene diamine salts of cyanoacetic acid and amine (other than triethylene diamine) salts of cyanates. It has been our experience that each of these salts tend to have their problems in powder coating systems typically one of imparting discoloration to the cured resinous material. As also noted in the prior art, it has been common place to extend the catalyst systems with various hardeners, e.g. the curing agents such as polyamides obtained by the condensation of polymerized fatty acid and polyamines, low viscosity modified amine hardeners sold under the trademark Araldite. Where additional conventional curing agents are added to the triethylene diamine salt of thiocyanic acid, problems result because of premature gelation in the melt mixing of the epoxy powder coating composition. The molding compounds do not have the desired stability or shelf life.

The catalyst is included in the formulation consisting of epoxy compound pigment leveling agent, etc., in proportion sufficient for enhancing the cure rate of the epoxy at a temperature of 300° F. or greater. Broadly, the catalyst is included in a proportion of from about 2-10 parts by weight per 100 parts (phr) of epoxy compound or resin. In a preferred case, the level of catalyst is from about 3-5 parts per 100 parts of epoxy resin.

In preparing the epoxy powder coating systems, conventional additives, pigments, leveling agents commonly used in epoxy coatings, are utilized as desired. For example, various leveling agents can be used to enhance the flow of the epoxy under curing conditions, and these include polymeric or monomeric acetels such as polyvinyl formal, polyvinylacetel, diethyl-2-ethyl hexanol acetel, di-2-ethylhexyl acetaldehyde-acetel; and polyglycols and polyglycol ethers such as polyethylene glycol and polypropylene glycol.

Pigments and additives which can be added to form the epoxy powder coating system include titanium dioxide, barytes antimony oxide, cadmium red and fillers such as calcium carbonate, calcium sulfate, glass and the like. The additives, pigments, leveling agents, etc. are added in conventional proportions used in the prior art.

The following examples provide the preferred system for carrying out the process of this invention, and is merely representative of typical operating parameters.

EXAMPLE 1

Test powder coating compositions were prepared by mixing an epoxy compound sold under the treatment D.E.R. 663U by the Dow Chemical Company. This epoxy compound has an epoxide equivalent weight (grams of resin containing 1 gram equivalent weight of epoxide) of 730–840, a softening point of 88-98 as measured by Durran's mercury method in degrees centigrade, a viscosity of O-S as measured in a 40% by weight solution in Dowanol DB glycol ether solvent, a cast density of 9.9 pounds per gallon and a specific gravity of 1.19.

A formulation powder coating composition was prepared and comprised 100 grams of D.E.R. 663U epoxy resin, 0.99 grams of a leveling agent consisting of a complex, polymeric liquid sold under the trademark MODAFLOW-II, 60 grams titanium dioxide, and 5

After the powder coatings were cured, various measurements were made. The results are shown in the table.

TABLE 1

| Catalyst | Temp. °F. | phr | Coating Thickness | Cure Time | Impact 3/8" sphere (in. pds) Open | Reverse | 60° Gloss | MEK double rub | Pencil Hardness | Appearance |
|---|---|---|---|---|---|---|---|---|---|---|
| monotriethylene diamine salt of thiocyanic acid | 270° F. | 5 | 2.1 | 19 min. | P-30 | F-30 | 86 | F-20 | 2H+ | ORP |
| " | 270° F. | 5 | 2.2 | 15 min. | P-45 | F-45 | 86 | F-30 | 3H+ | ORP |
| " | 270° F. | 5 | 2.3 | 20 min. | P-60 | F-30 | 79 | F-30 | 3H− | ORP |
| " | 270° F. | 5 | 2.2 | 30 min. | P-30 | F-30 | 84 | F-30 | 3H+ | ORP |
| " | 270° F. | 5 | 1.9 | 40 min. | P-30 | F-30 | 64 | F-30 | 3H+ | ORP |
| " | 300° F. | 5 | 2.2 | 10 min. | P-60 | F-30 | 100 | F-15 | 3H+ | ORP |
| " | 300° F. | 5 | 2.4 | 15 min. | P-45 | F-30 | 100 | F-15 | 3H+ | ORP |
| " | 300° F. | 5 | 2.1 | 30 min. | P-45 | Fs-45 | 100 | F-15 | 3H+ | ORP |
| " | 300° F. | 5 | 2.6 | 40 min. | P-60 | F-30 | 100 | F-20 | 3H+ | ORP |
| " | 360° F. | 5 | 2.3 | 5 min. | P-60 | F-30 | 100 | F-10 | 3H+ | S-Y-ORP |
| " | 360° F. | 5 | 2.4 | 10 min. | F-30 | P-60 | 100 | F-15 | 3H+ | S-Y-ORP |
| " | 360° F. | 5 | 2.2 | 20 min. | P-60 | F-30 | 100 | F-20 | 3H+ | S-Y-ORP |
| " | 360° F. | 5 | 2.0 | 30 min. | P-60 | Fs-60 | 100 | F-20 | 3H+ | S-Y-ORP |
| " | 360° F. | 5 | 2.3 | 40 min. | P-60 | Fs-60 | 99 | F-15 | 3H+ | S-Y-ORP |
| bis-triethylene diamine salt of thiocyanic acid | 270° F. | 5 | 1.7 | 10 min. | Fs-45 | F-30 | 81 | F-15 | 3H+ | ORP |
| " | 270° F. | 5 | 1.7 | 15 min. | P-45 | F-30 | 92 | F-15 | 3H+ | ORP |
| " | 270° F. | 5 | 1.7 | 30 min. | Fs-60 | F-30 | 86 | F-20 | 3H+ | ORP |
| " | 270° F. | 5 | 1.7 | 30 min. | P-60 | Fs-45 | 78 | F-30 | 3H+ | ORP |
| " | 270° F. | 5 | 1.7 | 40 min. | P-60 | Fs-30 | 76 | F-30 | 3H+ | ORP |
| " | 300° F. | 5 | 1.8 | 10 min. | Fs-60 | Fs-30 | 96 | F-15 | 3H+ | ORP |
| " | 300° F. | 5 | 2.0 | 15 min. | Fs-60 | Fs-45 | 98 | F-20 | 3H+ | ORP |
| " | 300° F. | 5 | 1.9 | 20 min. | P-60 | Fs-60 | 98 | F-25 | 3H+ | ORP |
| " | 300° F. | 5 | 2.0 | 30 min. | P-60 | Fs-60 | 97 | F-30 | 3H+ | ORP |
| " | 300° F. | 5 | 1.7 | 40 min. | P-60 | Fs-60 | 98 | F-40 | 3H+ | ORP |
| " | 360° F. | 5 | 1,9 | 5 min. | Fs-60 | Fs-30 | 100 | F-20 | 3H+ | S-Y-ORP |
| " | 360° F. | 5 | 1.8 | 10 min. | P-60 | Fs-60 | 100 | F-20 | 3H+ | S-Y-ORP |
| " | 360° F. | 5 | 1.9 | 20 min. | P-60 | P-60 | 100 | F-25 | 3H+ | S-Y-ORP |
| " | 360° F. | 5 | 1.9 | 30 min. | P-60 | P-60 | 100 | F-25 | 3H+ | S-Y-ORP |
| " | 360° F. | 5 | 1.9 | 40 min. | P-60 | Fs-60 | 100 | F-20 | 3H+ | S-Y-ORP |

P - pass
Fs - microscopic failure
S - slight
Y - yellow
ORP - orange peel
MEK - methylethyl ketone
V - very
impact (inch lbs.)

grams catalyst systems as set forth.

The 270° F. gel time of this formulation was measured at 390 seconds, whereas the same formulation with 20 parts hardener, e.g., Araldite pentamide, etc., was less than one second. At 360° F. temperatures, the gel time was 28 seconds, and thus longer than the salt hardener combination at 270° F.

EXAMPLE 2 Extruded-Formulations

The formulations of Example 1 were blended in a V-blender for about one-half hour. The blended formulation then was extruded in a model PR-46 extruder sold by Buss Condux, Inc. The conditions in the extruder were as follows: the screw temperature was 110° F., the middle temperature 110° F., and the outlet 210° F., the screw RPM was 100 and the feed RPM 16. Melt mixing of the formulation was conducted for a period of one minute, and then the molten material solidified on a two-roll chill roll mill to produce a sheet of about 1/16" thick. This sheet was crushed into chips and ground in a Micro-pulverizer, screened and sieved through a 200 mesh screen (74 microns). The resulting epoxy powder coatings then were sprayed onto a Bonderite 1000 steel panel at various thicknesses and cured under the conditions described.

In the table, impact resistance was measured by a standard impact test which included dropping a three-eighths inch steel sphere weighing 2 pounds directly onto the coated Bonderite panel (open), and then onto the uncoated side (reverse). P in both the open direct and open reverse refers to pass and Fs refers to microscopic failure of the coating. The number value for the test is the inch-pounds force applied. In this case, 60 pounds was the maximum that could be recorded. The MEK double rub test was used to determine the resistance of the coating to methylethylketone solvent, and P or F represents pass or fail for 100 double runs. With respect to appearance, S refers to slight discoloration or orange peel, Y refers to yellow, and ORP represents an orange peel effect, i.e., a slightly wrinkled coating surface. It is not significant of color. The term V is representative of the adjective very which is used to give an indication as to the degree of discoloration, e.g. very yellow.

EXAMPLE 3

An epoxy powder coating of the same formulation of Example 1 was produced except that a triethylene diamine salt of cyanoacetic acid was substituted for the triethylene diamine salt of thiocyanic acid. The powder coating was prepared by mixing the resin in a solvent and then evaporating the solvent to form a solid material, which was then ground. Cured products synthesized with the triethylene diamine salt of cyanoacetic acid were discolored to a greater extent than the resins cured with the triethylene diame salts of thiocyanic acid. Cure times were similar to those for the 1:1 triethylene diamine salt of thiocyanic acid.

What is claimed is:

1. In a process for curing a finely divided 1-2-epoxy resin having a lower softening point of not less than 40° C. by heating said epoxy resin to an elevated temperature in the presence of a catalyst, the improvement which comprises heating said epoxy resin in the presence of a triethylene diamine salt of thiocyanic acid.

2. The process of claim 1 wherein said salt is included in a proportion of 2 to 10 parts by weight per 100 parts of epoxy resin.

3. The process of claim 2 wherein said salt is included in a proportion of from 3–5 parts per 100 parts of epoxy resin.

* * * * *

UNITED STATES PATENT AND TRADEMARK OFFICE
CERTIFICATE OF CORRECTION

PATENT NO. : 4,161,575
DATED : 17 July 1979
INVENTOR(S) : John P. Seymour, Rocco L. Mascioli, Burton D. Beitchman, Philip J. Zaluska It is certified that error appears in the above-identified patent and that said Letters Patent are hereby corrected as shown below:

Column 1, Lines 64 and 65
 Delete "dihydroxynaphthalene" and substitute therefor -- dihydroxynaphthylene --

Column 2, Line 57.
 Delete "treatment" and substitute therefor -- trademark --

Table 1 should appear as shown on the attached sheet.

Signed and Sealed this

*Fifteenth* Day of *January 1980*

[SEAL]

*Attest:*

SIDNEY A. DIAMOND

*Attesting Officer*     *Commissioner of Patents and Trademarks*

TABLE 1

| Catalyst | Temp. °F | phr | Coating Thickness | Cure Time | Impact 3/8" sphere (in.-lbs) Open | Impact 3/8" sphere (in.-lbs) Reverse | 60° Gloss | MEK double rub | Pencil Hardness | Appearance |
|---|---|---|---|---|---|---|---|---|---|---|
| monotriethylene diamine salt of thiocyanic acid | 270°F | 5 | 2.1 | 10 min. | P-30 | F-30 | 86 | F-20 | 2H | OK |
| " | 270°F | 5 | 2.2 | 15 min. | P-45 | F-45 | 86 | P-30 | 3H+ | OK |
| " | 270°F | 5 | 2.3 | 20 min. | P-60 | F-30 | 79 | F-30 | 3H+ | OK |
| " | 270°F | 5 | 2.2 | 30 min. | P-30 | F-30 | 84 | P-30 | 3H+ | OK |
| " | 270°F | 5 | 1.9 | 40 min. | P-30 | F-30 | 64 | F-30 | 3H+ | OK |
| " | 300°F | 5 | 2.2 | 10 min. | P-60 | F-30 | 100 | F-15 | 3H+ | OK |
| " | 300°F | 5 | 2.2 | 15 min. | P-45 | F-30 | 100 | F-15 | 3H+ | OK |
| " | 300°F | 5 | 2.4 | 20 min. | P-45 | F-30 | 100 | F-15 | 3H+ | OK |
| " | 300°F | 5 | 2.6 | 30 min. | P-30 | F-30 | 97 | F-15 | 3H+ | OK |
| " | 300°F | 5 | 2.1 | 30 min. | Fs-45 | Fs-45 | 100 | F-15 | 3H+ | OK |
| " | 300°F | 5 | 2.6 | 40 min. | P-60 | F-30 | 100 | F-20 | 3H+ | OK |
| " | 360°F | 5 | 2.3 | 5 min. | P-60 | F-30 | 100 | F-10 | 3H+ | S-Y-OK |
| " | 360°F | 5 | 2.4 | 10 min. | P-30 | F-60 | 100 | P-15 | 3H+ | S-Y-OK |
| " | 360°F | 5 | 2.2 | 20 min. | P-60 | F-30 | 100 | F-20 | 3H+ | S-Y-OK |
| " | 360°F | 5 | 2.0 | 30 min. | P-60 | Fs-60 | 100 | F-20 | 3H+ | S-Y-OK |
| " | 360°F | 5 | 2.3 | 40 min. | P-60 | Fs-60 | 99 | F-15 | 3H+ | S-Y-OK |